3,580,744
Patented May 25, 1971

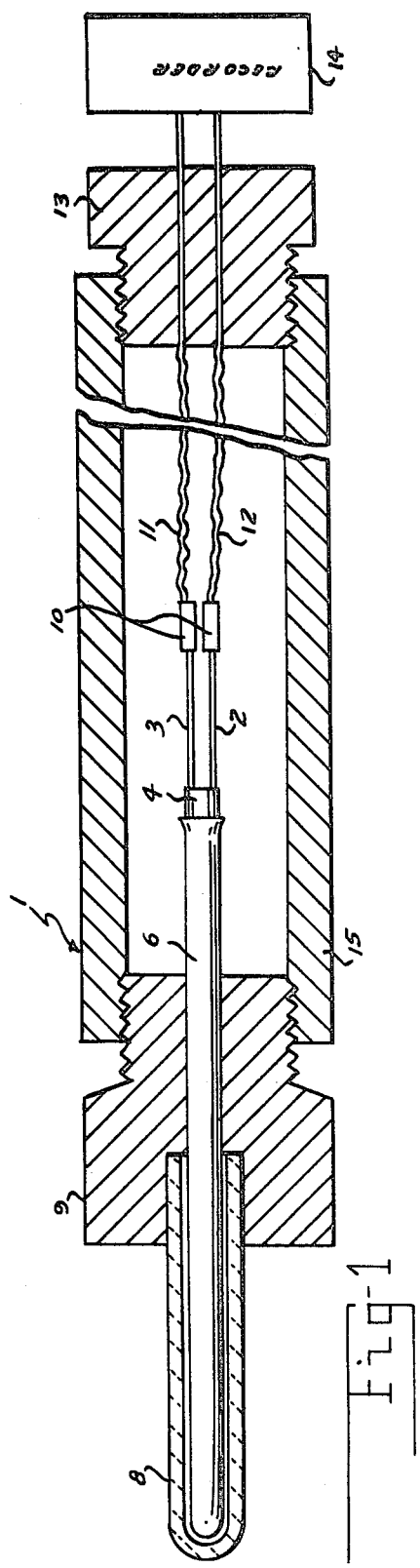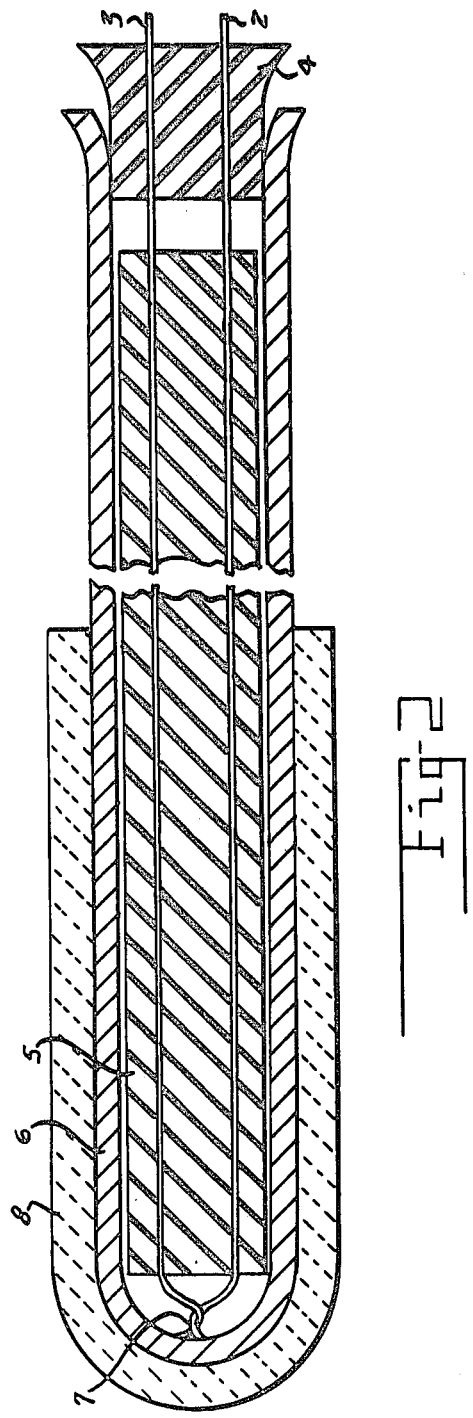

3,580,744
IMMERSION THERMOCOUPLE FOR ATMOSPHERIC AND VACUUM ENVIRONMENTS
Shingo Inouye, Kettering, and George Saul, Dayton, Ohio, assignors to the United States of America as represented by the Secretary of the United States Air Force
Filed Feb. 4, 1969, Ser. No. 796,356
Int. Cl. H01v 1/02
U.S. Cl. 136—234                                3 Claims

ABSTRACT OF THE DISCLOSURE

A thermocouple assembly including a protection tube made of a tantalum alloy. The protection tube is of a length sufficient to encompass the thermocouple wires and is concentrically positioned inside of an outer tube made of quartz. Thus, the protection tube acts as a barrier and shields the thermocouple wires from the highly corrosive gases caused by metals acting on the quartz outer tube.

BACKGROUND OF THE INVENTION

(1) Field of the invention

The present invention relates to a thermocouple assembly capable of being utilized in the measurement of temperatures up to 3000° F. and in pressures that range from atmospheric to the low micron range. In particular, the thermocouple is capable of being used more than once in making such measurements without replacing the expensive thermocouple wires and even more important, without losing any sensitivity during the performance of repetitive measurements.

(2) Description of the prior art

Immersion thermocouple devices are well known to those skilled in the art. This fact is exemplified by Pat. 3,201,277 granted to Fish. In general, most immersion thermocouple devices utilize a protective cover such as refractory cement or quartz to protect the thermocouple wires from the molten metal. However, these devices are only used for one measurement because the thermocouple is either destroyed or deteriorated to such an extent that it is rendered useless.

Applicants, through their tantalum alloy protection tube, have made a significant advance over the prior art in that applicants' assembly can be used for repetitive temperature measurements.

SUMMARY OF THE INVENTION

The present invention is directed to an improved thermocouple device for the temperature measurement of molten ferrous and non-ferrous metals at temperatures to 3000° F. and at pressures ranging from atmospheric to the low micron range (50 microns) encountered in vacuum melting.

It has long been recognized in the temperature measuring art, with particular reference to the field of metallurgy, that it would be highly desirable to have a thermocouple device capable of making accurate and repetitive temperature measurements under the extreme conditions mentioned above. Thus, it will become apparent from the discussion below that applicants have produced such a thermocouple temperature measuring assembly.

As was previously mentioned, the prior art is replete with temperature measuring devices that were subject to being destroyed or rendered ineffective after the performance of one measurement. The prior art temperature measuring devices all utilized a thermocouple protected from the hot melt by some protective cover, usually made from a refractory cement or quartz. This covering protected the thermocouple wires from coming into actual contact with the hot melt, however, the thermocouple wires were not protected from the corrosive gases caused by the hot melt acting on the quartz or refractory cement protective cover. Applicants have solved this problem by interposing a tantalum alloy tube between the outside protection tube and the thermocouple wires. The instant invention has been used in repetitive temperature measurements for durations of 11 minutes in molten nickel alloys at a vacuum of 50 microns. A tantalum alloy is used because of its high melting point, its high malleable characteristic, and because it exhibits the characteristic of being inert to the point where it will not react with the gases formed by the heat acting on the outer quartz tube. In the instant invention, a tantalum-10% tungsten alloy has been used with excellent results.

The ability to conduct temperature measurements for greater periods of time enables inventors to secure greater control during the melting and processing of the metal and further enables applicants to exercise greater control over the heat of the melt during the critical pouring period.

BRIEF DESCRIPTION OF THE DRAWING

FIG. 1 is a partial view showing the entire thermocouple asembly, with the inner protection tube shown in elevation for clearness.

FIG. 2 is an enlarged sectional view of the protective thermocouple protective assembly.

DESCRIPTION OF THE PREFERRED EMBODIMENT

For a better understanding of the present invention, reference is now made to the following description taken in connection with the accompanying drawings, in which all like parts are designated by like reference characters.

The thermocouple assembly, generally designated as 1 in FIG. 1, is designed to be immersed into a molten metal for periods up to 11 minutes in a vacuum induction furnace at vacuum pressures ranging down to 50 microns. A cylindrical quartz tube 8, closed at one end and open at the other is the only portion of the thermocouple assembly which is exposed to the molten metal.

An apertured cylindrical stainless steel head 9 is provided with threads at one end and a bore at the other end. The outside diameter of the open end of the quartz tube 8 is of a size which, when inserted into the bore of head 9, is frictionally held in the bore. A cylindrical stainless steel housing 15 is used to support the head 9 and the associated thermocouple components. Upon final assembly, the head 9 is threadedly secured to one end of the stainless steel housing. The other end of housing 15 is terminated with a vacuum tight gland 13 having means for allowing lead wires 11 and 12 to pass on through to some recording means 14. The portion of the lead wires which lie longitudinally within the steel housing are formed in an expandable helical coil so as to provide extra lead length in order to facilitate the maintenance or repair of the assembly in the event such is necessary. A cold junction 10 is formed by the fusion of the lead wires 11 and 12 to thermocouple wires 2 and 3. The thermocouple wires are made from two dissimilar metals, usually platinum and platinum-10% rhodium.

FIG. 2 is an enlarged sectional perspective view of the protective assembly which constitutes the major portion of this invention. The two thermocouple wires which lead from the cold junction 10 pass through a rubber seal 4 which is used for positioning the thermocouple wires, and more importantly for preventing any gases from flowing into the inner protective tube 6 and thereby contaminate wires 2 and 3. The portion which is passed through the seal 4 is further passed through a double bore alumina insulator 5 thereby insulating the wires from each other. The portion of the wires 2 and 3 which extend beyond the double bore insulator, away from the rubber seal end, are fused together to form a hot junction 7. The hot junction and the double bore insulator are disposed within the inner protection tube 6, the hot junction, of course, being in intimate contact with the inside closed end of the tantalum-107 tungsten protection tube 6. A portion of tube 6 passes through the head aperture and is concentrically disposed within the quartz tube 8 with the outside closed end of protective tube 6 in intimate contact with the inside closed end of quartz tube 8, the minimum clearance between the outside diameter of tube 6 and the inside diameter of quartz tube 8 being at a minimum. It has been found that an optimum skin thickness for the inner protection tube 6 is 0.02 inch. It is to be understood of course that the thickness is not restricted to this size.

The overall length of the theremocouple assembly is 40 inches, and the length of the tantalum tube approximately 16 inches, it being understood of course that these dimensions are nominal and that other dimensions could be used depending upon the circumstances. It has also been found that the protection tube 6 causes a time delay in measuring the temperature because of the fact that it must be heated along with the hot junction. However, because of the thin skin thickness of the inner protection tube 6, this time delay is insignificant and is therefore of no consequence.

Although quartz tube 8 has been immersed in molten metal for periods exceeding 11 minutes without actual physical destruction, gases are continually formed because of the molten metal attacking the quartz. These gases are highly corrosive and would destroy the ability of the thermocouple to generate an EMF corresponding to the heat imposed on it. The protection tube 6 prevents the corrosive gases from contacting the thermocouple wires 2 and 3 thus insuring correct temperature measurements. The quartz tube 8, although not destroyed during a temperature measurement, is considerably weakened structurally and should be replaced each time a new measurement is made.

Accordingly, it can be seen that the present invention is a significant contribution to the art because of its capability of performing repetitive measurements and because of the simplicity of its construction.

What is claimed is:

1. A thermocouple assembly for measuring the temperature of molten ferrous and non-ferrous metals in an atmospheric or vacuum environment comprising:
    a tubular metal housing having an opening extending therethrough from its upper end to its lower end;
    a vaccum tight sealing means attached to said upper end of said housing;
    two lead wires extending from outside of said housing through said sealing means and thence longitudinally to an intermediate point within said opening;
    a metallic head member attached to and adapted to close said lower end of said housing, said head member having an opening circular in cross section extending therethrough, the upper portion of said opening having a smaller diameter than the diameter of the lower portion of said opening;
    an uncoated, metallic thermocouple protection tube closed at its lower end and open at its upper end, said tube being fixedly positioned within said smaller diameter opening in said head member, said upper end of said tube extending above head member and said lower end of said tube extending below said head member;
    a quartz tube closed at its lower end and open at its upper end, said quartz tube being positioned over said lower end of said protection tube and in intimate contact therewith, the upper end of said quartz tube being positioned within and in intimate contact with said larger diameter opening in said head member, and said quartz tube being removable from said larger diameter opening and from its position over said protection tube to permit replacement thereof;
    an insulator positioned in said protection tube so that its upper end is below said upper end of said protection tube and its lower end is above said lower end of said protection tube, said insulator havnig two spaced apart longitudinal openings extending throughout its length;
    a sealing means positioned in the opening in said upper end of said protection tube;
    two thermocouple wires extending from an intermediate point within said opening in said housing downwardly through said opening and thence into said protection tube through said sealing means, said two wires thereafter extending through said protection tube to a point adjacent its lower end, one wire passing through one opening in said insulator and the other wire passing through the other opening in said insulator;
    a cold junction formed within said housing by connecting each one of said thermocouple wires to one of said lead wires; and
    a thermocouple hot junction formed by fusing together the ends of said thermocouple wires in said lower end of said protection tube, said hot junction being in intimate contact with said protection tube at its lower end.

2. The thermocouple assembly of claim 1 in which the composition of the protection tube is tantalum with 10% tungsten.

3. The thermocouple assembly of claim 1 in which the thickness of the protection tube is 0.02 inch.

References Cited

UNITED STATES PATENTS

| | | | |
|---|---|---|---|
| 1,773,825 | 8/1930 | Simms | 136—232X |
| 2,463,427 | 3/1949 | Richards | 136—234X |
| 2,584,616 | 2/1952 | Richards | 136—234 |
| 2,858,351 | 10/1958 | Taylor | 136—235X |
| 2,971,041 | 2/1961 | France | 136—234 |
| 3,011,005 | 11/1961 | Silver | 136—234 |
| 3,069,752 | 12/1962 | Sherning | 136—233X |
| 3,106,493 | 10/1963 | Japka | 136—242 |
| 3,201,277 | 8/1965 | Fish | 136—234 |
| 3,278,341 | 10/1966 | Gee | 136—233 |

FOREIGN PATENTS

| | | | |
|---|---|---|---|
| 706,643 | 3/1954 | Great Britain | 136—242 |
| 925,618 | 3/1955 | Germany | 136—234 |

CARL D. QUARFORTH, Primary Examiner

H. E. BEHREND, Assistant Examiner

U.S. Cl. X.R.

136—242